United States Patent
Mori et al.

(10) Patent No.: US 10,458,384 B2
(45) Date of Patent: Oct. 29, 2019

(54) PUMPED-STORAGE POWER GENERATION CONTROL DEVICE AND PUMPED-STORAGE POWER GENERATION CONTROL METHOD

(71) Applicant: KABUSHIKI KAISHA TOSHIBA, Minato-ku (JP)

(72) Inventors: Junji Mori, Kokubunji (JP); Toshiaki Suzuki, Yokohama (JP); Kiyoshi Kusunoki, Kawasaki (JP); Toru Kubo, Yokohama (JP); Shoji Iida, Fuchu (JP); Takahisa Kageyama, Ichikawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 774 days.

(21) Appl. No.: 15/153,022

(22) Filed: May 12, 2016

(65) Prior Publication Data

US 2017/0260961 A1    Sep. 14, 2017

(30) Foreign Application Priority Data

Mar. 10, 2016    (JP) ................. 2016-047269

(51) Int. Cl.
*F03B 13/06* (2006.01)
*F03B 15/00* (2006.01)
(Continued)

(52) U.S. Cl.
CPC .............. *F03B 13/06* (2013.01); *F01D 15/10* (2013.01); *F01D 17/00* (2013.01); *F03B 15/00* (2013.01);
(Continued)

(58) Field of Classification Search
CPC .......... F03B 13/06; F03B 15/00; F03B 15/08; F04D 15/0066; Y02E 10/22
See application file for complete search history.

(56) References Cited

U.S. PATENT DOCUMENTS 4,109,160 A * 8/1978 Goto ........................ F03B 13/06
290/52
4,132,901 A * 1/1979 Crausbay .................. E02B 9/00
290/42
(Continued)

FOREIGN PATENT DOCUMENTS

DE    10 2006 010 852 A1    9/2007
DE    10 2011 116 222 A1    4/2013
(Continued)

OTHER PUBLICATIONS

Office Action dated Jul. 12, 2016 in Japanese Patent Application No. 2016-047269 with English translation.
(Continued)

*Primary Examiner* — Ronald D Hartman, Jr.
(74) *Attorney, Agent, or Firm* — Oblon, McClelland, Maier & Neustadt, L.L.P.

(57) ABSTRACT

According to one embodiment, a pumped-storage power generation control device includes a control section that controls at least one of the pumping input of the pumped-storage power generation facility in the pumping operation and the power output of the pumped-storage power generation facility in the power generating operation such that a value, which is obtained by a predetermined calculation using the measurement value relating to the pumping input of the pumped-storage power generation facility in the pumping operation and the measurement value relating to the power output of the pumped-storage power generation facility in the power generating operation, becomes a set target value.

12 Claims, 7 Drawing Sheets

Power station A (51) Int. Cl.
*H02J 15/00* (2006.01)
*F01D 15/10* (2006.01)
*F01D 17/00* (2006.01)
*G05B 15/02* (2006.01)
*H02K 7/18* (2006.01)

(52) U.S. Cl.
CPC ............ *G05B 15/02* (2013.01); *H02J 15/003* (2013.01); *H02K 7/1823* (2013.01); *F05B 2270/00* (2013.01); *Y02E 10/22* (2013.01); *Y02E 10/226* (2013.01); *Y02E 60/17* (2013.01); *Y02P 90/50* (2015.11)

(56) References Cited

U.S. PATENT DOCUMENTS

| | | | | |
|---|---|---|---|---|
| 5,864,183 | A * | 1/1999 | Fisher, Jr. | F03B 13/06 290/40 C |
| 9,422,948 | B2 * | 8/2016 | Kim | F15B 15/00 |
| 2005/0034452 | A1 * | 2/2005 | Davis | E02B 9/00 60/398 |
| 2011/0169264 | A1 * | 7/2011 | Choate | F03B 13/06 290/43 |
| 2012/0019004 | A1 * | 1/2012 | Ekern | F03B 13/06 290/53 |
| 2012/0274070 | A1 * | 11/2012 | Payre | F03B 13/06 290/52 |
| 2014/0216022 | A1 * | 8/2014 | Jiang | F15B 1/04 60/327 |
| 2014/0270965 | A1 * | 9/2014 | Igel, V | E02B 9/02 405/53 |
| 2015/0056085 | A1 * | 2/2015 | Fiske | F03B 13/06 417/313 |
| 2015/0128579 | A1 * | 5/2015 | Law | F03B 15/005 60/327 |
| 2015/0176559 | A1 * | 6/2015 | Hongawa | F03B 3/10 60/398 |

FOREIGN PATENT DOCUMENTS

| | | |
|---|---|---|
| JP | 61-129478 A | 6/1986 |
| JP | 62-178775 A | 8/1987 |
| JP | 63-124870 A | 5/1988 |
| JP | 3268457 | 3/2002 |

OTHER PUBLICATIONS

Extended European Search Report dated Jul. 17, 2017 in European Patent Application No. 16170247.7.

* cited by examiner

PUMPED-STORAGE POWER GENERATION CONTROL DEVICE AND PUMPED-STORAGE POWER GENERATION CONTROL METHOD

CROSS-REFERENCE TO RELATED APPLICATIONS

This application is based upon and claims the benefit of priority from Japanese Patent Application No. 2016-047269, filed Mar. 10, 2016, the entire contents of which are incorporated herein by reference.

FIELD

Embodiments disclosed herein relate generally to a pumped-storage power generation control device and a pumped-storage power generation control method.

BACKGROUND

Power generation facilities such as solar photovoltaics and wind turbines vary in output power in accordance with conditions in the natural environment. When use of these renewable energy facilities is increased, there is a need for power stations such as conventional thermal power and water power stations to be able to absorb a variation in the output of the renewable energy facility. For example, a pumped-storage power station which has been operated to adjust for variation in the daily electric power demand (relatively long term change) is requested to function not just for long-term adjustment but also short-term adjustment.

However, the operation is switched from pumping to power generating or from power generating to pumping as necessary in order to realize input/output adjustment in a pumped-storage power generation facility. Therefore, there is a problem in that operation of the facility should be stopped and then restarted, which takes time.

Under the circumstances, it is desired to provide a technique for switching the pumping operation (power consumption) and the power generating operation (power supply) without stopping the pumped-storage power generation facility.

DETAILED DESCRIPTION

Hereinafter, embodiments will be described with reference to the accompanying drawings.

In general, according to one embodiment, there is provided a pumped-storage power generation control device including: a first measuring unit that measures a pumping input or an electrical quantity corresponding to the pumping input of a pumped-storage power generation facility in a pumping operation; a second measuring unit that measures a power output or an electrical quantity corresponding to the power output of a pumped-storage power generation facility in a power generating operation; and a control section that controls at least one of the pumping input of the pumped-storage power generation facility in the pumping operation and the power output of the pumped-storage power generation facility in the power generating operation such that a value, which is obtained by a predetermined calculation using the measurement value measured by the first measuring unit and the measurement value measured by the second measuring unit, becomes a set target value.

(First Embodiment)

First, a first embodiment will be described with reference to FIGS. 1 to 6.

Figure 1:
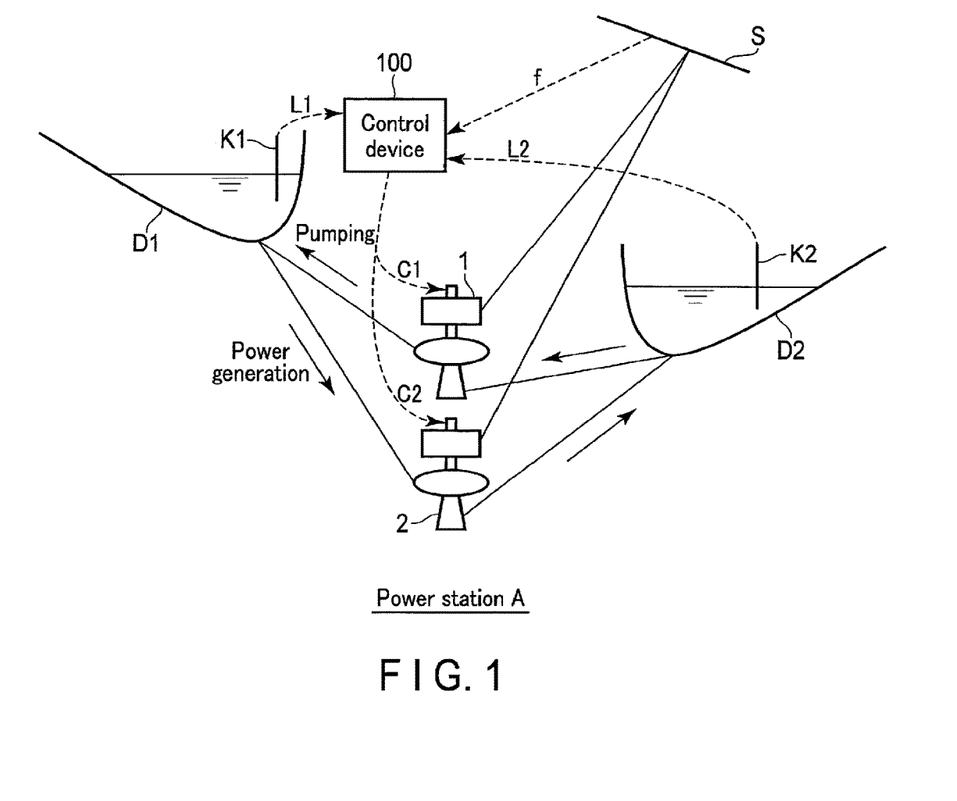
FIG. 1 is a diagram illustrating an example of a configuration of a pumped-storage power generation system according to a first embodiment.

FIG. 1 is a diagram illustrating an example of a configuration of a pumped-storage power generation system according to the first embodiment.

A pumped-storage power station A is provided with an upper dam D1 and a lower dam D2, and provided with a plurality of pumped-storage power generation facilities between both dams; for example, a pumped-storage power generation facility 1 and a pumped-storage power generation facility 2.

The pumped-storage power generation facilities 1 and 2 are, for example, of a variable speed type having a variable speed function. Herein, the pumped-storage power generation facilities 1 and 2 are both assumed to be able to adjust a pumping input and a power output. Further, the pumped-storage power generation facility 2 may be a pumped-storage power generation facility (a fixed speed pumped-storage power generation facility) which can adjust only the power output, or may be a hydroelectric power generation facility having no pumped-storage function. In addition, the pumped-storage power generation facility 1 may be a pump facility which can adjust an input without a power generation facility.

The pumped-storage power generation facility 1 is electrically connected to an electric power system S, and performs a pumping operation, for example. In this case, the pumped-storage power generation facility 1 performs the pumping from the lower dam D2 to the upper dam D1. On the other hand, the pumped-storage power generation facility 2 is electrically connected to the electric power system S, and performs a power generating operation for example. In this case, the pumped-storage power generation facility 2 performs the power generation using the water of the upper dam D1, and sends the used water to the lower dam D2.

In addition, the pumped-storage power station A is provided with a pumped-storage power generation control device 100 (hereinafter, referred to as "control device 100").

The control device 100 has a control section corresponding to elements 23 to 29 in FIG. 1 that controls at least one of the pumping input of the pumped-storage power generation facility 1 in a pumping operation and the power output of the pumped-storage power generation facility 2 in a power generating operation such that a value, which is obtained by a predetermined calculation (for example, an addition, a difference, a ratio, etc.) using i) a measurement value of the pumping input or an electrical quantity (for example, a voltage, a current, etc.) corresponding to the pumping input of the pumped-storage power generation facility 1 in the pumping operation, and ii) the power output of the pumped-storage power generation facility 2 in the power generating operation or an electrical quantity (for example, a voltage, a current, etc.) corresponding to the power output, becomes a set target value.

The control device 100 acquires a frequency f of the electric power system S and calculates a frequency difference Δf, acquires a water level L1 of the upper dam D1 and a water level L2 of the lower dam D2 through water level detectors K1 and K2 respectively, and sends commands C1 and C2 to the pumped-storage power generation facilities 1 and 2 based on the type of the acquired information, so as to be able to control the pumped-storage power generation facilities 1 and 2. The control device 100 may be disposed anywhere. For example, the control device 100 may be disposed in any one of the pumped-storage power generation facilities 1 and 2, or may be disposed in a place other than the pumped-storage power generation facilities 1 and 2.

Figure 2:
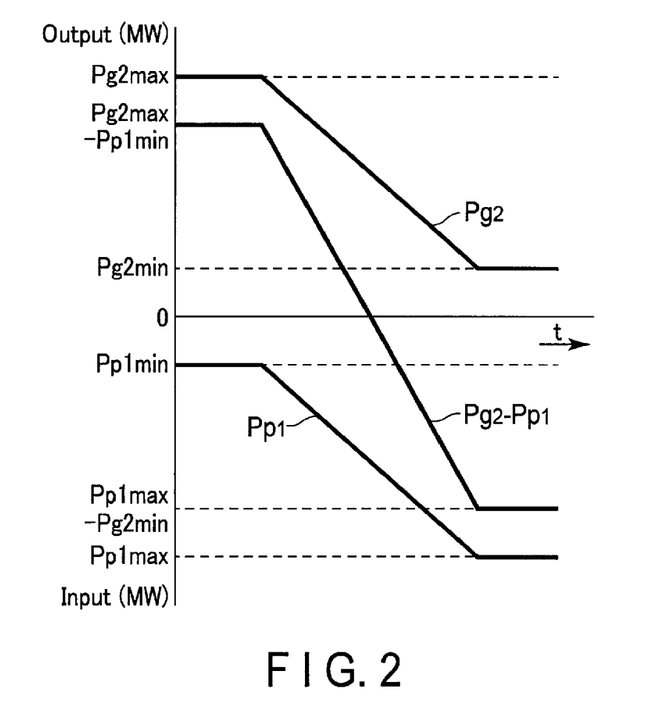
FIG. 2 is a graph for describing a control of a control device 100 in the first embodiment.

FIG. 2 is a graph illustrating a control performed by the control device 100.

In the graph, the axis upward from the center portion in the sheet surface represents the power output "Output (MW)", and the axis downward to the center portion represents the pumping input "Input (MW)". In addition, the axis in the horizontal direction represents a time "t".

Herein, the axis of the power output "Output (MW)" and the axis of the pumping input "Input (MW)" are depicted as a common axis. The value of the pumping input can be considered as a negative output (MW) on the axis of the power output "Output (MW)".

"Pp1" indicates the pumping input (effective power absolute value) of the pumped-storage power generation facility 1, and "Pg2" indicates the power output (effective power absolute value) of the pumped-storage power generation facility 2.

"Pp1min" and "Pp1max" indicate a minimum value (or a lower limit value) and a maximum value (or an upper limit value) of the pumping input of the pumped-storage power generation facility 1, respectively. A range from "Pp1min" to "Pp1max" is a range of the pumping operation of the pumped-storage power generation facility 1.

On the other hand, "Pg2min" and "Pg2max" indicate a minimum value (or a lower limit value) and a maximum value (or an upper limit value) of the pumping input of the pumped-storage power generation facility 1, respectively. A range from "Pg2min" to "Pg2max" is a range of the power generation of the pumped-storage power generation facility 2.

The control device 100 controls, for example, at least one of the pumping input of the pumped-storage power generation facility 1 and the power output of the pumped-storage power generation facility 2 such that a value "Pg2−Pp1" (that is, a total output as the pumped-storage power station A), which is obtained by subtracting an absolute value of the pumping input "Pp1" of the pumped-storage power generation facility 1 in the pumping operation from an absolute value of the power output "Pg2" of the pumped-storage power generation facility 2 in the power generating operation, becomes a set target value. The target value may be appropriately changed, for example, in accordance with a change in electric power demand.

In this case, in a case where the value of the pumping input is treated as a negative output "−Pp1 (MW)" on the axis of the power output "Output (MW)", the control device 100 controls at least one of the pumping input of the pumped-storage power generation facility 1 and the power output of the pumped-storage power generation facility 2 such that a value "Pg2+(−Pp1)", which is obtained by adding "−Pp1" to "Pg2", becomes a set target value. In addition, the control may be implemented by making a modification such that "Pg2/Pp1" or "Pp1/Pg2" becomes a set target value in place of "Pg2−Pp1" or "Pg2+(−Pp1)". In other words, at least one of the pumping input of the pumped-storage power generation facility 1 and the power output of the pumped-storage power generation facility 2 may be controlled such that a ratio between the absolute value of the power output "Pg2" of the pumped-storage power generation facility 2 in the power generating operation and the absolute value of the pumping input "Pp1" of the pumped-storage power generation facility 1 in the pumping operation becomes a set target value. In this embodiment, a case where the control is made to make "Pg2−Pp1" become a set target value is exemplified.

The control device 100 may change the target value from a positive value to a negative value or vice versa. In addition, the target value used by the control device 100 may be changed in a range from a first value "Pg2max−Pp1min" obtained by subtracting the minimum value Pp1min of the pumping input of the pumped-storage power generation facility 1 from the maximum value Pg2max of the power output of the pumped-storage power generation facility 2 to a second value "Pg2min−Pp1max" ("Pp1max−Pg2min" when viewed from the input (MW) side) obtained by subtracting the maximum value Pp1max of the pumping input of the pumped-storage power generation facility 1 from the minimum value Pg2min of the power output of the pumped-storage power generation facility 2.

In addition, the control device 100 has a function of correcting the target value or at least one of the pumping input of the pumped-storage power generation facility 1 and the power output of the pumped-storage power generation facility 2 in accordance with the frequency f of the electric power system S illustrated in FIG. 1.

In addition, the control device 100 may have a function of estimating a variation in output demanded by the corresponding power station and a power station group and a variation in output of the water levels of the upper and lower dams based on a measurement value of the power output of the pumped-storage power generation facility 2 in the power generating operation using a Kalman filter, and a function of correcting the target value or at least one of the pumping input of the pumped-storage power generation facility 1 in the pumping operation and the power output of the pumped-storage power generation facility 2 in the power generating operation in accordance with the estimated power output or the water levels of the upper and lower dams. In this way, one of the objects to estimate the variation of the power output is to previously prevent any dam from being filled with water and to operate with a sufficient margin in the water level of each dam. For example, in a case where the pumped-storage power generation facility 1 performs the power output, the pumped-storage power generation facility 2 performs the pumping input in a relation of |Power Output|>|Pumping Input| and, for example, the previous operation is estimated to maintain the relation |Power Output|>|Pumping Input| in a situation that the water level of the lower dam D2 comes near the upper limit, and the operation is switched to cause a relation of |Power Output|<|Pumping Input| (at least one of the pumping input of the pumped-storage power generation facility 1 and the power output of the pumped-storage power generation facility 2 in the power generating operation is corrected). Therefore, the water level of the lower dam D2 can be kept within a safe region.

In such a configuration, in a case where the water level L1 of the upper dam D1 is equal to or more than (or exceeds to) a predetermined level (that is, "L1≥Predetermined Level" or "L1>Predetermined Level"), or such a case is estimated (for example, in a case where a first reference value is at a level higher than L1, a water level difference Ld1 between the water level L1 and the first reference value satisfies a relation of "Ld1≤Predetermined Value" or "Ld1<Predetermined Value", or in a case where the first reference value is at a level lower than L1, the water level difference Ld1 between the water level L1 and the first reference value satisfies a relation "Ld1≥Predetermined Value" or "Ld1>Predetermined Value"), the control device 100 determines that the water level L1 of the upper dam D1 is too high, and corrects the target value or at least one of the pumping input and the power output such that a relation between the absolute value of the power output of the pumped-storage power generation facility 2 in the power generating operation and the absolute value of the pumping input of the pumped-storage power generation facility 1 in the pumping operation becomes "|Power Output|≥|Pumping Input|" or "|Power Output|>|Pumping Input|" (for example, when the target value is within a positive range, the target value is controlled to be continuously shifted to a negative region).

In addition, in a case where the water level L1 of the upper dam D1 is equal to or less than (or less than) a predetermined level (that is, "L1≤Predetermined Level" or "L1<Predetermined Level"), or such a case is estimated (for example, in a case where the first reference value is at a level higher than L1, the water level difference Ld1 between the water level L1 and the first reference value satisfies a relation of "Ld1≥Predetermined Value" or "Ld1>Predetermined Value", or in a case where the first reference value is at a level lower than L1, the water level difference Ld1 between the water level L1 and the first reference value satisfies a relation of "Ld1≤Predetermined Value" or "Ld1<Predetermined Value"), the control device 100 determines that the water level L1 of the upper dam D1 is too low, and corrects the target value or at least one of the pumping input and the power output such that a relation between the absolute value of the power output of the pumped-storage power generation facility 2 in the power generating operation and the absolute value of the pumping input of the pumped-storage power generation facility 1 in the pumping operation becomes "|Power Output|≤|Pumping Input|" or "|Power Output|<|Pumping Input|" (for example, when the target value is within a negative region, the target value is controlled to be continuously shifted to a positive region).

On the other hand, in a case where the water level L2 of the lower dam D2 satisfies a relation of "L2≥Predetermined Level" or "L2>Predetermined Level"), or such a case is estimated (for example, in a case where a second reference value is at a level higher than L2, a water level difference Ld2 between the water level L2 and the second reference value satisfies a relation of "Ld2≤Predetermined Value" or "Ld2<Predetermined Value", or in a case where the second reference value is at a level lower than L2, the water level difference Ld2 between the water level L2 and the second reference value satisfies a relation of "Ld2≥Predetermined Value" or "Ld2>Predetermined Value"), the control device 100 determines that the water level L2 of the lower dam D2 is too high, and corrects the target value or at least one of the pumping input and the power output such that a relation between the absolute value of the pumping input of the pumped-storage power generation facility 1 in the pumping operation and the absolute value of the power output of the pumped-storage power generation facility 2 in the power generating operation becomes "|Pumping Input|≥|Power Output|" or "|Pumping Input|>|Power Output|" (for example, when the target value is in a negative region, the target value is controlled to be continuously shifted to a positive region).

In addition, in a case where the water level L2 of the lower dam D2 satisfies a relation of "L2≤Predetermined Level" or "L2<Predetermined Level", or such a case is estimated (for example, in a case where the second reference value is at a level higher than L2, the water level difference Ld2 between the water level L2 and the second reference value satisfies a relation of "Ld2≥Predetermined Value" or "Ld2>Predetermined Value", or in a case where the second reference value is at a level lower than L2, the water level difference Ld2 between the water level L2 and the second reference value satisfies a relation of "Ld2≤Predetermined Value" or "Ld2<Predetermined Value"), the control device 100 determines that the water level L2 of the lower dam D2 is too low, and corrects the target value or at least one of the pumping input and the power output such that a relation between the absolute value of the pumping input of the pumped-storage power generation facility 1 in the pumping operation and the absolute value of the power output of the pumped-storage power generation facility 2 in the power generating operation becomes "|Pumping Input|≤|Power Output|" or "|Pumping Input|<|Power Output|" (for example, when the target value is in a positive region, the target value is controlled to be continuously shifted to a negative region).

In other words, the control device 100 changes the pumping input Pp1 of the pumped-storage power generation facility 1 and the power output Pg2 of the pumped-storage power generation facility 2 as the target value is changed in line with "Pg2−Pp1".

Figure 3:
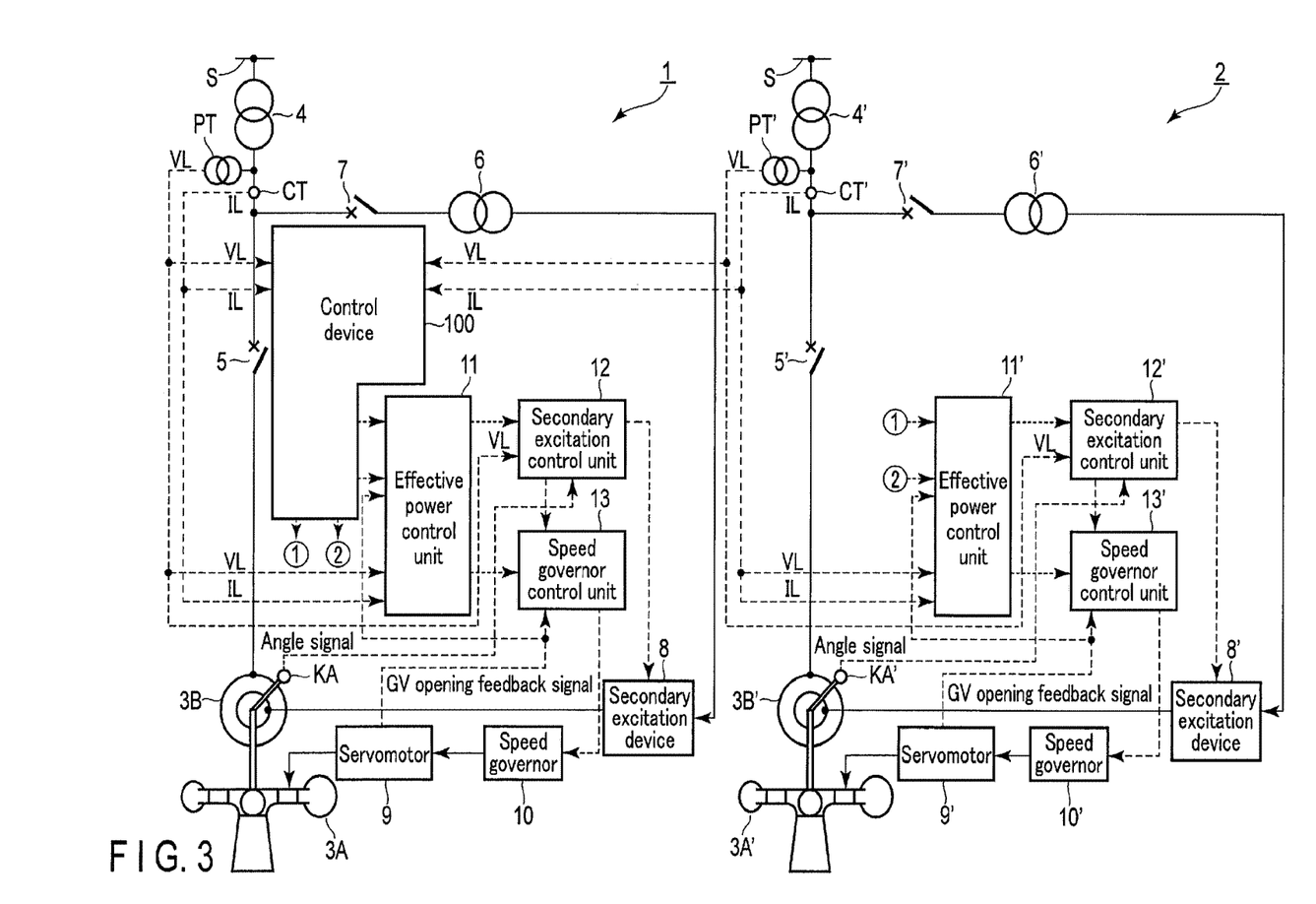
FIG. 3 is a diagram illustrating a configuration related to a control of the pumped-storage power generation system according to the first embodiment.

FIG. 3 is a diagram illustrating a configuration related to a control of the pumped-storage power generation system according to the first embodiment.

Further, herein, the description will be about an example of the pumped-storage power generation facilities 1 and 2 employing a variable speed pumped-storage power generation system of a secondary excitation type, but the invention may be similarly applied to a variable speed pumped-storage power generation system of a full converter type.

The pumped-storage power generation facility 1 is provided with, as basic components, machinery such as a generator motor 3B connected to a pump turbine 3A, a main transformer 4 connected to the electric power system S, a parallel circuit breaker 5, an excitation transformer 6, an excitation circuit breaker 7, a secondary excitation device 8, a servomotor 9, a speed governor 10, an angle detector KA, a potential transformer PT, and a current transformer CT. In addition, the pumped-storage power generation facility 1 is provided with basic control functions such as an effective power control unit 11, a secondary excitation control unit 12, and a speed governor control unit 13.

The effective power control unit 11 calculates a rotation speed and controls effective power based on a voltage VL and a current VI supplied from the potential transformer PT and the current transformer CT.

The secondary excitation control unit 12 performs control of the secondary excitation device 8 based on the rotation speed calculated by the effective power control unit 11, the voltage VL obtained from the potential transformer PT, and an angle signal supplied from the angle detector KA. The secondary excitation device 8 is connected to the secondary winding of the generator motor 3B, and provided with a frequency converter 8a which applies an alternating current of a variable frequency, and a secondary excitation unit 8b which controls the frequency of the frequency converter 8a in accordance with a control signal supplied from the secondary excitation control unit 12.

The speed governor control unit 13 generates a guide vane opening control signal based on a calculation result in the effective power control unit 11, a calculation result in the secondary excitation control unit 12, and a guide vane opening feedback signal supplied from the servomotor 9, and performs a guide vane opening control of the pump turbine 3A through the speed governor 10 and the servomotor 9. The speed governor 10 is provided with an actuator 10a which drives the servomotor 9, and a converter coil 10b which operates the actuator 10a in accordance with the guide vane opening control signal supplied from the speed governor control unit 13.

The pumped-storage power generation facility 2 is also provided with similar components to those of the pumped-storage power generation facility 1; that is, machinery such as a generator motor 3B' connected to a pump turbine 3A', a main transformer 4' connected to the electric power system S, a parallel circuit breaker 5', an excitation transformer 6', an excitation circuit breaker 7', a secondary excitation device 8', a servomotor 9', a speed governor 10', an angle detector KA', a potential transformer PT', and a current transformer CT', and also provided with basic control functions such as an effective power control unit 11', a secondary excitation control unit 12', and a speed governor control unit 13'.

In this embodiment, for example, the above-described control device 100 is provided in the pumped-storage power generation facility 1. Hereinafter, the control device 100 will be described in detail.

Figure 4:
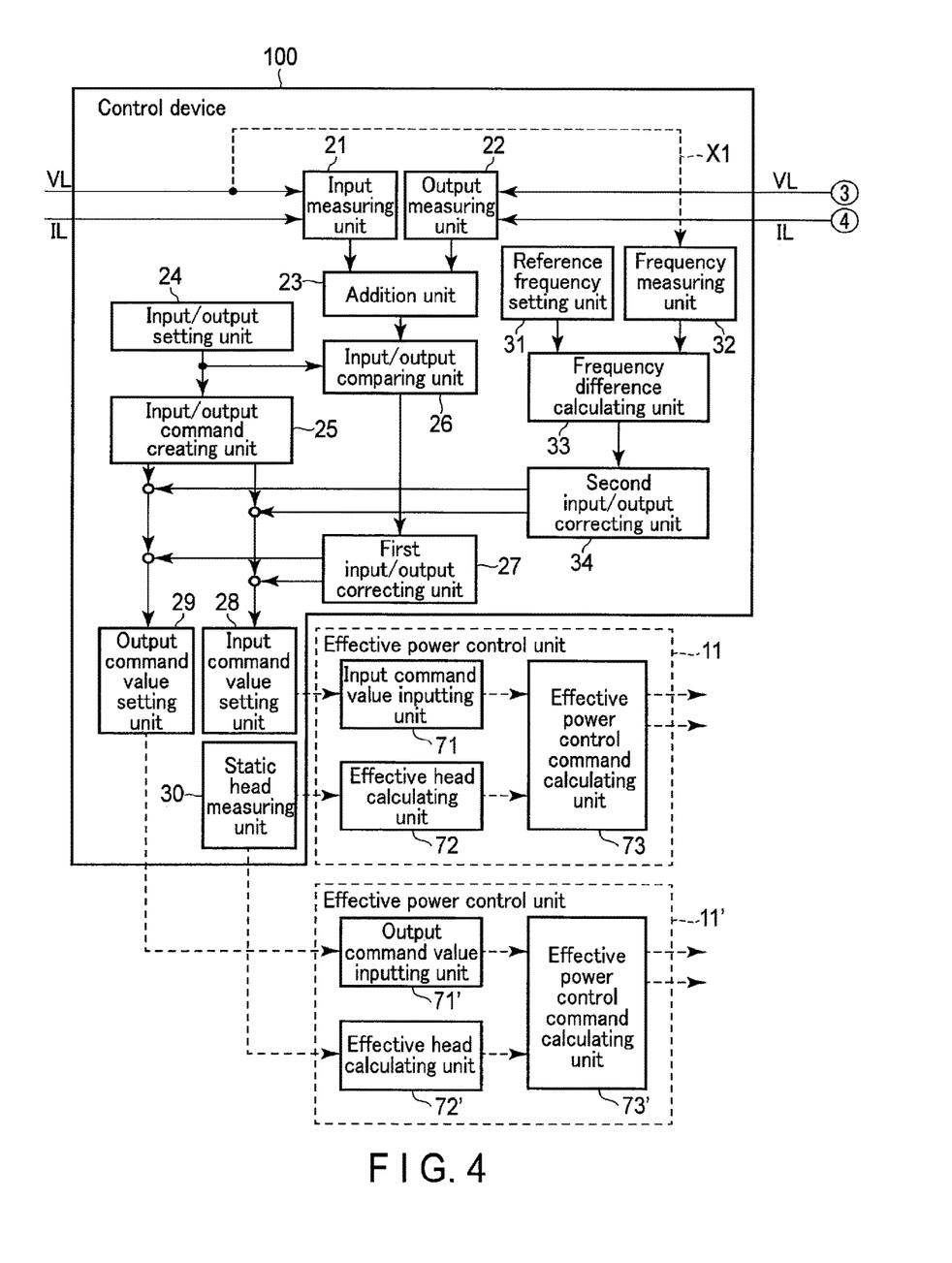
FIG. 4 is a diagram illustrating a functional configuration of the control device 100 in the first embodiment.

FIG. 4 is a diagram illustrating a functional configuration of the control device 100. The control device 100 is provided with various types of functions such as an input measuring unit (a first measuring unit) 21, an output measuring unit (a second measuring unit) 22, an addition unit 23, an input/output setting unit 24, an input/output command creating unit 25, an input/output comparing unit 26, a first input/output correcting unit 27, an input command value setting unit 28, an output command value setting unit 29, and a static head measuring unit 30.

The input measuring unit 21 measures the pumping input of the pumped-storage power generation facility 1 in the pumping operation based on the voltage VL and the current VI supplied from the potential transformer PT and the current transformer CT.

The output measuring unit 22 measures the power output of the pumped-storage power generation facility 2 in the power generating operation based on the voltage VL and the current VI supplied from the potential transformer PT' and the current transformer CT' in the pumped-storage power generation facility 2.

The addition unit 23 adds the power output (for example, "Pg2") measured by the output measuring unit 22 and the pumping input (for example, "−Pp1" (the negative output)) measured by the input measuring unit 21 to obtain a total output (for example, "Pg2−Pp1") of the pumped-storage power station A.

The input/output setting unit 24 sets a target value with respect to the pumping input of the pumped-storage power generation facility 1, the power output of the pumped-storage power generation facility 2, or the total output of the pumped-storage power station A which is a value obtained by adding the pumping input of the pumped-storage power generation facility 1 and the power output of the pumped-storage power generation facility 2. The target value may be appropriately updated in accordance with a change in the electric power demand.

The input/output command creating unit 25 creates an input command (a command of the pumping input) with respect to the pumped-storage power generation facility 1 and an output command (a command of the power output) with respect to the pumped-storage power generation facility 2 based on the target value set by the input/output setting unit 24.

The input/output comparing unit 26 compares the total output obtained by the addition unit 23 with the target value of the total output set by the input/output setting unit, and calculates a difference therebetween.

The first input/output correcting unit 27 corrects at least one of the input command and the output command created by the input/output command creating unit 25 based on the difference calculated by the input/output comparing unit 26 such that the corresponding difference becomes "0" (that is, to make the total output approach the target value).

The input command value setting unit 28 sets an input command value corresponding to the (corrected) input command which is supplied from the input/output command creating unit 25, and supplies the corresponding input command value to the effective power control unit 11.

The output command value setting unit 29 sets an output command value corresponding to the (corrected) output command which is supplied from the input/output command creating unit 25, and supplies the corresponding output command value toward the pumped-storage power generation facility 2.

The static head measuring unit 30 measures the static head between the water surface of the upper dam D1 and the water surface of the lower dam D2, and supplies the measurement result to the effective power control unit 11 and also to the effective power control unit 11' of the pumped-storage power generation facility 2.

On the other hand, the effective power control unit 11 causes an input command value inputting unit 71 to input the input command value set by the input command value setting unit 28 of the control device 100, and causes an effective head calculating unit 72 to calculate an effective head based on the static head measured by the static head measuring unit 30 of the control device 100, and causes an effective power control command calculating unit 73 to generate a command value of the secondary excitation control unit 12 and a command value of the speed governor control unit 13 based on the input command value and the effective head.

In addition, the effective power control unit 11' of the pumped-storage power generation facility 2 causes an output command value inputting unit 71' to input the output command value set by the output command value setting unit 29 of the control device 100, causes the effective head calculating unit 72' to calculate an effective head based on the static head measured by the static head measuring unit 30 of the control device 100, and causes the effective power control command calculating unit 73' to generate a command value of the secondary excitation control unit 12' and a command value of the speed governor control unit 13' based on the output command value and the effective head.

With such a configuration, even in a case where there is a large change in the electric power demand, the supply power can be adjusted in a short time. Moreover, the pumping operation and the power generating operation can be switched without stopping the pumped-storage power generation facilities 1 and 2.

In addition, the control device 100 is also provided with, as other functions, a reference frequency setting unit 31, a frequency measuring unit 32, a frequency difference calculating unit 33, and a second input/output correcting unit 34.

The reference frequency setting unit 31 sets a reference frequency which is a reference value of the frequency f of the electric power system S.

The frequency measuring unit 32 measures the frequency f of the electric power system S. In the example of FIG. 4, a case where the frequency f of the electric power system S is measured and obtained from the voltage VL supplied through a path X1 is exemplified, but the frequency f of the electric power system S may be measured and obtained from a quantity (a current, a magnetic flux, etc.) other than the voltage VL.

The frequency difference calculating unit 33 calculates a frequency difference between the reference frequency set by the reference frequency setting unit 31 and the frequency measured by the frequency measuring unit 32.

The second input/output correcting unit 34 corrects at least one of the input command and the output command created by the input/output command creating unit 25 in accordance with the frequency difference calculated by the frequency difference calculating unit 33.

With such a configuration, even when the frequency f of the electric power system S varies, the input command value and the output command value can be adjusted to be an appropriate value in accordance with the variation.

Figure 5:
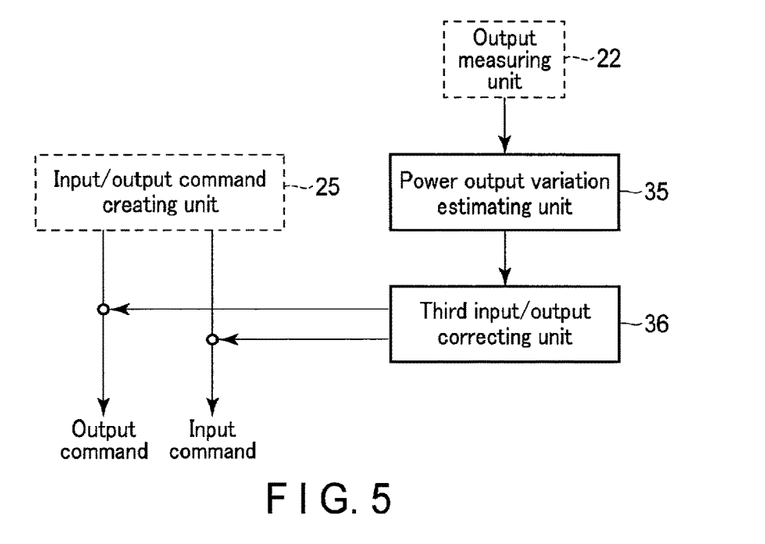
FIG. 5 is a diagram illustrating another functional configuration of the control device 100 in the first embodiment.

In addition, the control device 100 is provided with, as other functions, a power output variation estimating unit 35 and a third input/output correcting unit 36 as illustrated in FIG. 5.

The power output variation estimating unit 35 estimates a variation in output demanded by the power station and the power station group based on a transition of the measurement value of the power output measured by the power measuring unit 22 using a Kalman filter, and estimates variations in the water levels of the upper and lower dams from the result and the measurement values of the variations in the water levels of the upper and lower dams measured by an upper-dam water-level detecting unit 42 and a lower-dam water-level detecting unit 45.

The third input/output correcting unit 36 corrects at least one of the input command and the output command created by the input/output command creating unit 25 in accordance with the variation in the power output estimated by the power output variation estimating unit 35.

With such a configuration, even when there is an estimated variation in the power output, the input command value and the output command value can be adjusted to appropriate values in accordance with the variation.

Figure 6:
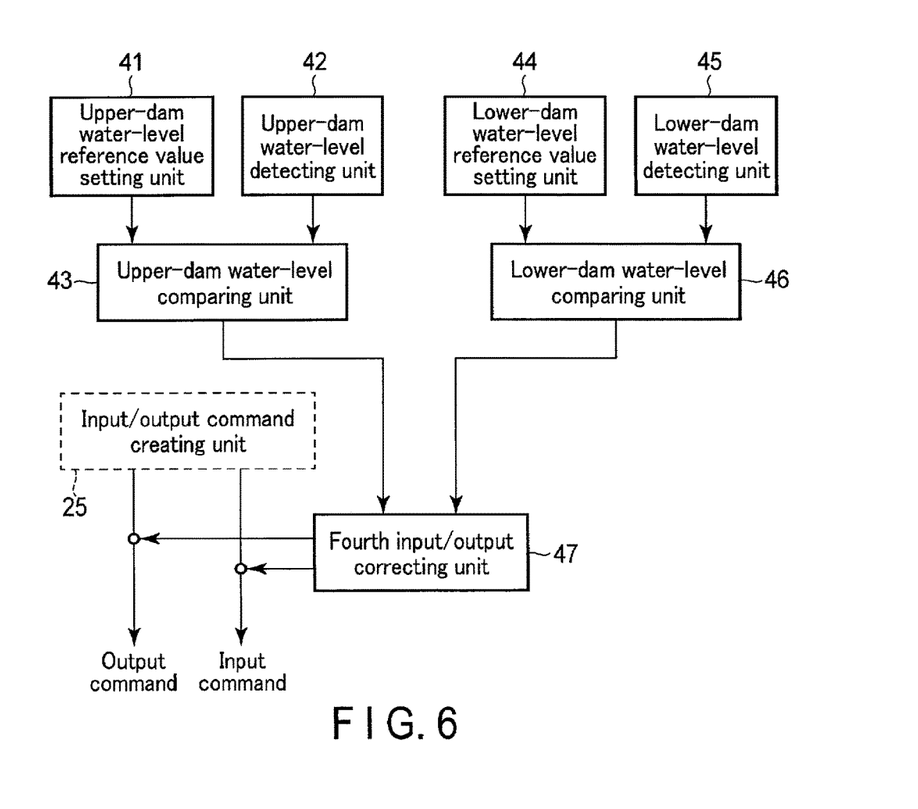
FIG. 6 is a diagram illustrating another functional configuration of the control device 100 in the first embodiment.

In addition, the control device 100 is provided with, as other functions, an upper-dam water-level reference value setting unit 41, the upper-dam water-level detecting unit 42, an upper-dam water-level comparing unit 43, a lower-dam water-level reference value setting unit 44, the lower-dam water-level detecting unit 45, a lower-dam water-level comparing unit 46, and a fourth input/output correcting unit 47 as illustrated in FIG. 6.

The upper-dam water-level reference value setting unit 41 sets the first reference value which is a reference for determining whether the upper dam D1 is filled with water.

The upper-dam water-level detecting unit 42 detects the water level L1 of the upper dam D1 through the water level detector K1.

The upper-dam water-level comparing unit 43 compares the first reference value set by the upper-dam water-level reference value setting unit 41 with the water level L1 of the upper dam D1 detected by the upper-dam water-level detecting unit 42, and calculates a water level difference therebetween.

The lower-dam water-level reference value setting unit 44 sets the second reference value which is a reference for determining whether the lower dam D2 is filled with water.

The lower-dam water-level detecting unit 45 detects the water level L2 of the lower dam D2 through the water level detector K2.

The lower-dam water-level comparing unit 46 compares the second reference value set by the lower-dam water-level reference value setting unit 44 with the water level L2 of the lower dam D2 detected by the lower-dam water-level detecting unit 45, and calculates a water level difference therebetween.

The fourth input/output correcting unit 47 corrects at least one of the input command and the output command created by the input/output command creating unit 25 in accordance with the water level difference calculated by the upper-dam water-level comparing unit 43 and the water level difference calculated by the lower-dam water-level comparing unit 46.

For example, in a case where the water level L1 of the upper dam D1 satisfies a relation of "L1≥Predetermined Level" or "L1>Predetermined Level", or such a case is estimated (for example, in a case where the first reference value is at a level higher than L1, the water level difference Ld1 calculated by the upper-dam water-level comparing unit 43 satisfies "Ld1≤Predetermined Value" or "Ld1<Predetermined Value", or in a case where the first reference value is at a level lower than L1, the water level difference Ld1 calculated by the upper-dam water-level comparing unit 43 satisfies a relation of "Ld1≥Predetermined Value" or "Ld1>Predetermined Value"), the fourth input/output correcting unit 47 determines that the water level L1 of the upper dam D1 is too high, and corrects at least one of the input command and the output command created by the input/output command creating unit 25 such that a relation between the absolute value of the power output of the pumped-storage power generation facility 2 in the power generating operation and the absolute value of the pumping input of the pumped-storage power generation facility 1 in the pumping operation becomes "|Power Output|≥|Pumping Input|" or "|Power Output|>|Pumping Input|".

In addition, in a case where the water level L1 of the upper dam D1 satisfies a relation of "L1≤Predetermined Level" or "L1<Predetermined Level", or such a case is estimated (for example, in a case where the first reference value is at a level higher than L1, the water level difference Ld1 calculated by the upper-dam water-level comparing unit 43 satisfies a relation of "Ld1≥Predetermined Value" or "Ld1>Predetermined Value", or in a case where the first reference value is at a level lower than L1, the water level difference Ld1 calculated by the upper-dam water-level comparing unit 43 satisfies a relation of "Ld1≥Predetermined Value" or "Ld1<Predetermined Value"), the fourth input/output correcting unit 47 determines that the water level L1 of the upper dam D1 is too low, and corrects at least one of the input command and the output command created by the input/output command creating unit 25 such that a relation between the absolute value of the power output of the pumped-storage power generation facility 2 in the power generating operation and the absolute value of the pumping input of the pumped-storage power generation facility 1 in the pumping operation becomes "|Power Output|≤|Pumping Input|" or "|Power Output|<|Pumping Input|".

In addition, in a case where the water level L2 of the lower dam D2 satisfies a relation of "L2≥Predetermined Level" or "L2>Predetermined Level", or such a case is estimated (for example, in a case where the second reference value is at a level higher than L2, the water level difference Ld2 calculated by the lower-dam water-level comparing unit 46 satisfies a relation of "Ld2≤Predetermined Value" or "Ld2<Predetermined Value", or in a case where the second reference value is at a level lower than L2, the water level difference Ld2 calculated by the lower-dam water-level comparing unit 46 satisfies a relation of "Ld2≥Predetermined Value" or "Ld2>Predetermined Value"), the fourth input/output correcting unit 47 determines that the water level L2 of the lower dam D2 is too high, and corrects at least one of the input command and the output command created by the input/output command creating unit 25 such that a relation between the absolute value of the pumping input of the pumped-storage power generation facility 1 in the pumping operation and the absolute value of the power output of the pumped-storage power generation facility 2 in the power generating operation becomes "|Pumping Input|≥|Power Output|" or "|Pumping Input|>|Power Output|".

In addition, in a case where the water level L2 of the lower dam D2 satisfies a relation of "L2≤Predetermined Level" or "L2<Predetermined Level", or such a case is estimated (for example, in a case where the second reference value is at a level higher than L2, the water level difference Ld2 calculated by the lower-dam water-level comparing unit 46 satisfies a relation of "Ld2≥Predetermined Value" or "Ld2>Predetermined Value", or in a case where the second reference value is at a level lower than L2, the water level difference Ld2 calculated by the lower-dam water-level comparing unit 46 satisfies a relation of "Ld2≤Predetermined Value" or "Ld2<Predetermined Value"), the fourth input/output correcting unit 47 determines that the water level L2 of the lower dam D2 is too low, and corrects at least one of the input command and the output command created by the input/output command creating unit 25 such that a relation between the absolute value of the pumping input of the pumped-storage power generation facility 1 in the pumping operation and the absolute value of the pumped-storage power generation facility 2 in the power generating operation becomes "|Pumping Input|≤|Power Output|" or "|Pumping Input|<|Power Output|".

With such a configuration, it is possible to prevent the upper dam D1 and the lower dam D2 becoming filled with water while maintaining the pumping operations of the pumped-storage power generation facility 1 and the power generating operation of the pumped-storage power generation facility 2.

For example, when the input command value with respect to the pumped-storage power generation facility 1 is set by the control device 100, the effective power control unit 11, the secondary excitation control unit 12, and the speed governor control unit 13 each perform the control according to the corresponding input command value. Therefore, a slip frequency control signal according to the corresponding input command value is supplied from the secondary excitation control unit 12 to the secondary excitation device 8, the guide vane opening control signal according to the corresponding input command value is supplied from the speed governor control unit 13 to the speed governor 10, and the pumped-storage power generation facility 1 is controlled to obtain the pumping input according to the corresponding input command value.

In addition, for example, when the output command value with respect to the pumped-storage power generation facility 2 is set by the control device 100, the effective power control unit 11', the secondary excitation control unit 12', and the speed governor control unit 13' each perform control according to the corresponding output command value. Therefore, the slip frequency control signal according to the corresponding output command value is supplied from the secondary excitation control unit 12' to the secondary excitation device 8', the guide vane opening control signal according to the corresponding output command value is supplied from the speed governor control unit 13' to the speed governor 10', and the pumped-storage power generation facility 2 is controlled to obtain the power output according to the corresponding output command value.

According to the first embodiment, even when the output of the power generation facility varies in a short time, the pumping operation and the power generating operation can be switched without stopping the pumped-storage power generation facility. Further, the variation in the output can be easily absorbed without installing a special mechanism.

Further, in the above embodiment, the description has been made about an example in a case where a variable speed pumped-storage power generation system of the secondary excitation type is employed, but the invention may be applied to the fixed speed pumped-storage power generation system the input of which can be adjusted. In the case of the fixed speed pumped-storage power generation facility, the control device 100 is provided with a flow rate control unit which controls a flow rate and a runner blade angle control unit which controls an angle of a runner blade in place of the effective power control unit 11 and the secondary excitation control unit 12. It is possible to realize the same operation as that of the variable speed facility even in the fixed speed facility by changing the flow rate by the flow rate control unit and by changing the angle of the runner blade by the runner blade angle control unit.

In addition, in the above embodiment, the description has been made about an example in which the pumped-storage power generation facility 1 and the pumped-storage power generation facility 2 are provided in the same power station, but the invention may be applied even to a case where the pumped-storage power generation facility 1 and the pumped-storage power generation facility 2 are provided in separate power stations. In addition, the invention may be applied even to a case where the upper dam and/or the lower dam of the pumped-storage power generation facility 1 and the upper dam and/or the lower dam of the pumped-storage power generation facility 2 are different. In a case where the upper dam and/or the lower dam of the pumped-storage power generation facility 1 and the upper dam and/or the lower dam of the pumped-storage power generation facility 2 are different, the pumped-storage power generation control device according to the invention calculates the input command and/or the output command of the pumped-storage power generation facility 1 and/or the pumped-storage power generation facility 2 based on the water level signals of the upper dam and/or the lower dam of the pumped-storage power generation facility 1 and the upper dam and/or the lower dam of the pumped-storage power generation facility 2.

(Second Embodiment)

Next, a second embodiment will be described with reference to FIGS. 7 and 8. Hereinafter, the same elements as those in the first embodiment described above will be denoted by the same symbols, and redundant descriptions will not be repeated.

Figure 7:
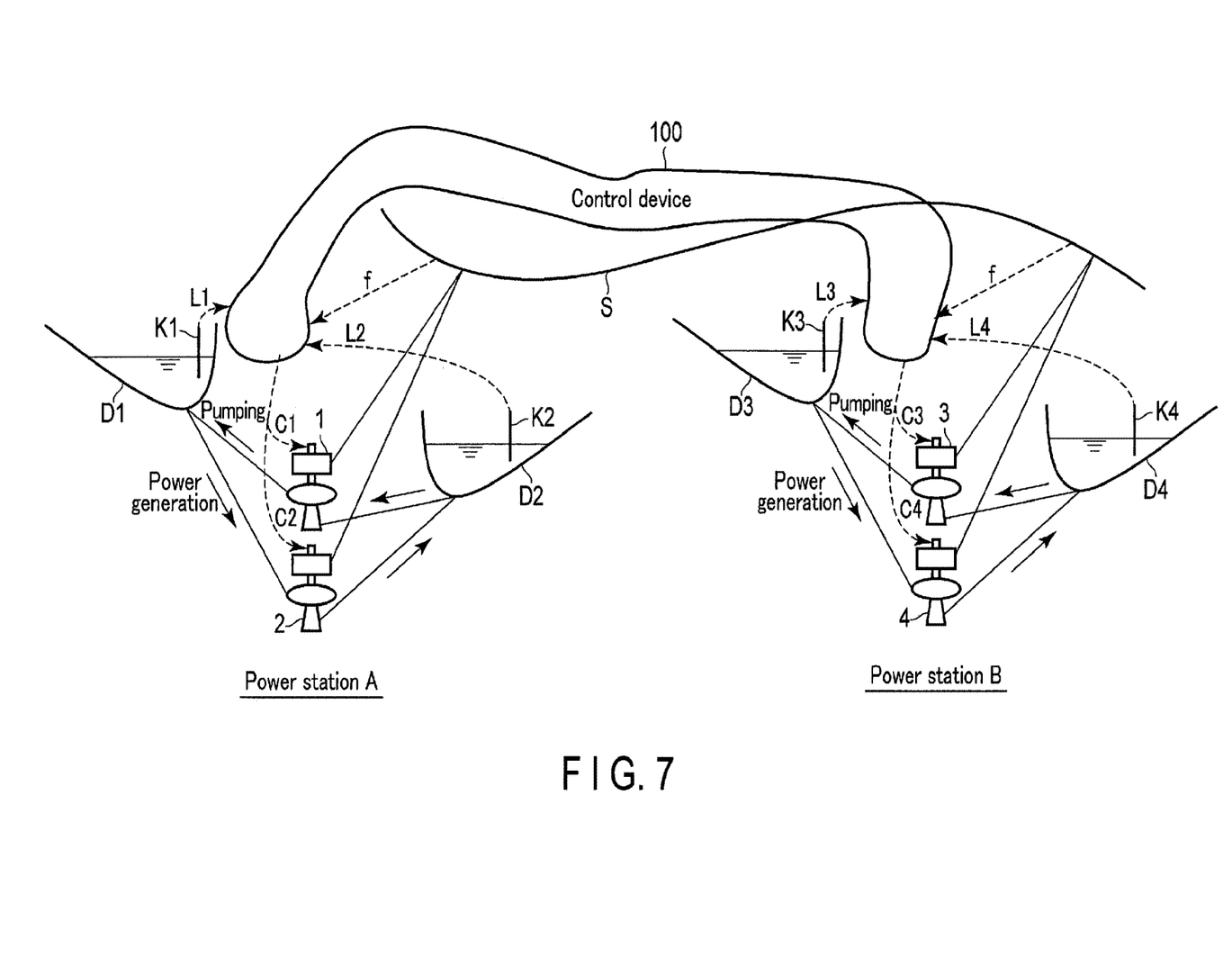
FIG. 7 is a diagram illustrating an example of a configuration of a pumped-storage power generation system according to a second embodiment.

FIG. 7 is a diagram illustrating an example of a configuration of a pumped-storage power generation system according to the second embodiment.

A pumped-storage power station A is provided with an upper dam D1 and a lower dam D2, and provided with a plurality of pumped-storage power generation facilities between both dams; for example, a pumped-storage power generation facility 1 and a pumped-storage power generation facility 2. On the other hand, another pumped-storage power station B is provided with an upper dam D3 and a lower dam D4, and provided with a plurality of pumped-storage power generation facilities (for example, a pumped-storage power generation facility 3 and a pumped-storage power generation facility 4) between both dams.

The pumped-storage power generation facility 1 is, for example, a variable speed pumped-storage power generation facility which has a variable speed function. The pumped-storage power generation facility 2 may be a pumped-storage power generation facility which can adjust at least the power output. Herein, the pumped-storage power generation facility 2 is assumed to be able to adjust both the pumping input and the power output. Similarly, the pumped-storage power generation facility 3 is, for example, a variable speed pumped-storage power generation facility having a variable speed function. The pumped-storage power generation facility 4 may be a pumped-storage power generation facility which can adjust at least the power output. Herein, the pumped-storage power generation facility 4 is assumed to be able to adjust both the pumping input and the power output.

The variable speed pumped-storage power generation facility 1 is electrically connected to an electric power system S, and performs a pumping operation for example. In this case, the variable speed pumped-storage power generation facility 1 performs the pumping from the lower dam D2 to the upper dam D1. On the other hand, the pumped-storage power generation facility 2 is electrically connected to the electric power system S, and performs a power generating operation for example. In this case, the pumped-storage power generation facility 2 performs the power generation using the water of the upper dam D1, and sends the used water to the lower dam D2.

Similarly, the variable speed pumped-storage power generation facility 3 is electrically connected to the electric power system S, and performs a pumping operation for example. In this case, the variable speed pumped-storage power generation facility 3 performs the pumping from the lower dam D4 to the upper dam D3. On the other hand, the pumped-storage power generation facility 4 is electrically connected to the electric power system S, and performs a power generating operation for example. In this case, the pumped-storage power generation facility 4 performs the power generation using the water of the upper dam D3, and sends the used water to the lower dam D4.

The control device 100 has a control section corresponding to elements 23 to 29 in FIG. 1 that controls: (1) at least one of the pumping input of the pumped-storage power generation facility 1 in a pumping operation and the power output of the pumped-storage power generation facility 2 in a power generating operation such that a value, which is obtained by a predetermined calculation (for example, an addition, a difference, a ratio, etc.) using i) a measurement value of the pumping input or an electrical quantity (for example, a voltage, a current, etc.) corresponding to the pumping input of the pumped-storage power generation facility 1 in the pumping operation, and ii) the power output of the pumped-storage power generation facility 2 in the power generating operation or an electrical quantity (for example, a voltage, a current, etc.) corresponding to the power output, becomes a set first target value; and (2) at least one of the pumping input of the pumped-storage power generation facility 3 in a pumping operation and the power output of the pumped-storage power generation facility 4 in a power generating operation such that a value, which is obtained by a predetermined calculation (for example, an addition, a difference, a ratio, etc.) using i) a measurement value of the pumping input or an electrical quantity (for example, a voltage, a current, etc.) corresponding to the pumping input of the pumped-storage power generation facility 3 in the pumping operation, and ii) the power output of the pumped-storage power generation facility 4 in the power generating operation or an electrical quantity (for example, a voltage, a current, etc.) corresponding to the power output, becomes a set second target value.

The control device 100 acquires a frequency f of the electric power system S and calculates a frequency difference $\Delta f$, acquires a water level L1 of the upper dam D1, a water level L2 of the lower dam D2, a water level L3 of the upper dam D3, and a water level L4 of the lower dam D4 through water level detectors K1, K2, K3, and K4 respectively, and sends commands C1, C2, C3, and C4 to the pumped-storage power generation facilities 1, 2, 3, and 4 based on the type of the acquired information, so as to be able to control the pumped-storage power generation facilities 1, 2, 3, and 4. The control device 100 may be disposed anywhere. For example, the control device 100 may be disposed in any one of the pumped-storage power generation facilities 1, 2, 3, and 4, or may be disposed in a place other than the pumped-storage power generation facilities 1, 2, 3, and 4.

Figure 8:
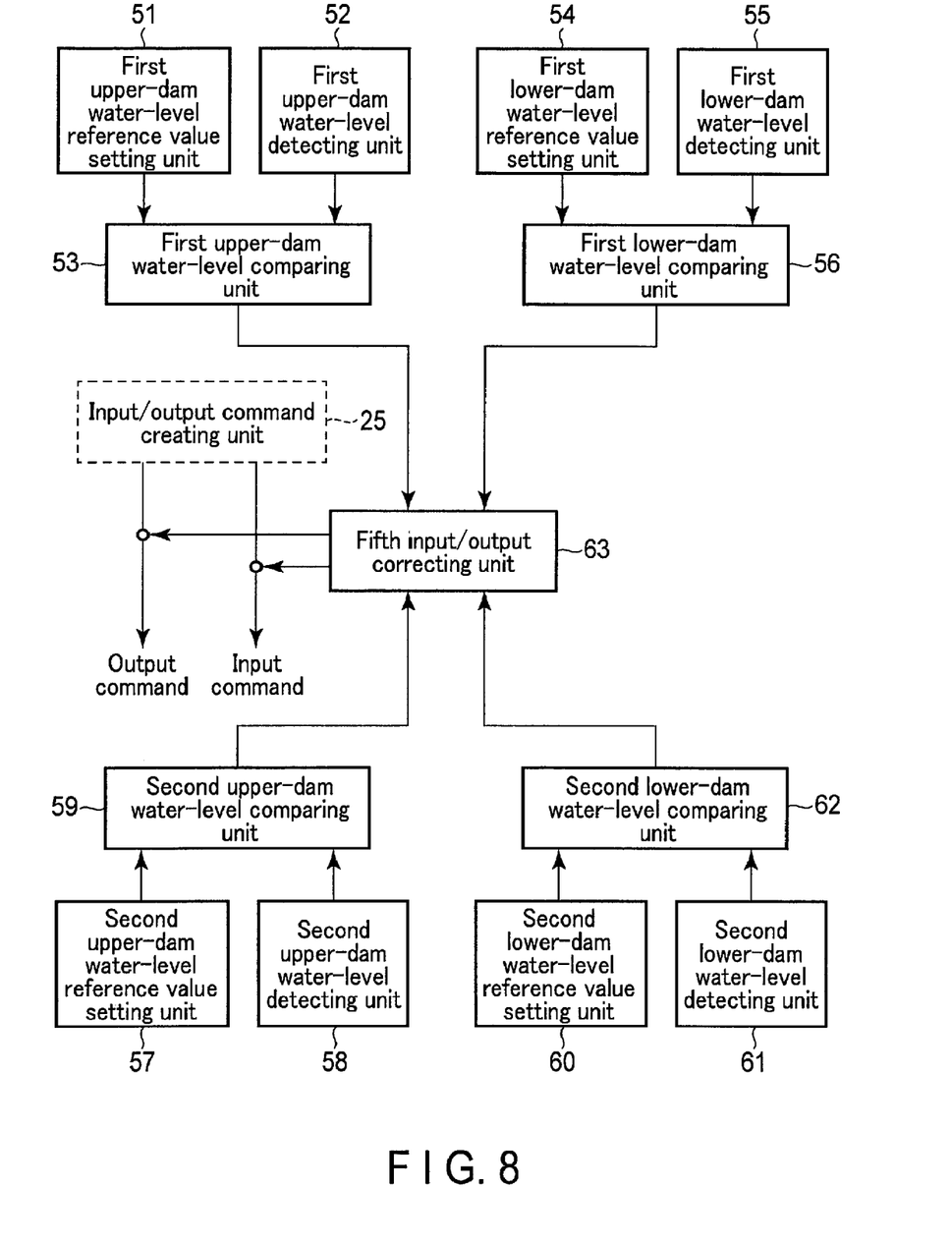
FIG. 8 is a diagram illustrating another functional configuration of a control device 100 in the second embodiment.

In addition, the control device 100 is provided with, as other functions, a first upper-dam water-level reference value setting unit 51, a first upper-dam water-level detecting unit 52, a first upper-dam water-level comparing unit 53, a first lower-dam water-level reference value setting unit 54, a first lower-dam water-level detecting unit 55, a first lower-dam water-level comparing unit 56, a second upper-dam water-level reference value setting unit 57, a second upper-dam water-level detecting unit 58, a second upper-dam water-level comparing unit 59, a second lower-dam water-level reference value setting unit 60, a second lower-dam water-level detecting unit 61, a second lower-dam water-level comparing unit 62, and a fifth input/output correcting unit 63 as illustrated in FIG. 8.

The first upper-dam water-level reference value setting unit 51 sets a first reference value which is a reference for determining whether the upper dam D1 is filled with water.

The first upper-dam water-level detecting unit 52 detects the water level L1 of the upper dam D1 through the water level detector K1.

The first upper-dam water-level comparing unit 53 compares the first reference value set by the first upper-dam water-level reference value setting unit 51 with the water level L1 of the upper dam D1 detected by the first upper-dam water-level detecting unit 52, and calculates a water level difference therebetween.

The first lower-dam water-level reference value setting unit 54 sets a second reference value which is a reference for determining whether the lower dam D2 is filled with water.

The first lower-dam water-level detecting unit 55 detects the water level L2 of the lower dam D2 through the water level detector K2.

The first lower-dam water-level comparing unit 56 compares the second reference value set by the first lower-dam water-level reference value setting unit 54 with the water level L2 of the lower dam D2 detected by the first lower-dam water-level detecting unit 55, and calculates a water level difference therebetween.

The second upper-dam water-level reference value setting unit 57 sets a third reference value which is a reference for determining whether the upper dam D3 is filled with water.

The second upper-dam water-level detecting unit 58 detects the water level L3 of the upper dam D3 through the water level detector K3.

The second upper-dam water-level comparing unit 59 compares the third reference value set by the second upper-dam water-level reference value setting unit 57 with the water level L3 of the upper dam D3 detected by the second upper-dam water-level detecting unit 58, and calculates a water level difference therebetween.

The second lower-dam water-level reference value setting unit 60 sets a fourth reference value which is a reference for determining whether the lower dam D4 is filled with water.

The second lower-dam water-level detecting unit 61 detects the water level L4 of the lower dam D4 through the water level detector K4.

The second lower-dam water-level comparing unit 62 compares the fourth reference value set by the second lower-dam water-level reference value setting unit 60 with the water level L4 of the lower dam D4 detected by the second lower-dam water-level detecting unit 61, and calculates a water level difference therebetween.

The fifth input/output correcting unit 63 corrects at least one of the input command and the output command created by an input/output command creating unit 25 in accordance with the water level difference calculated by the first upper-dam water-level comparing unit 53 and the water level difference calculated by the first lower-dam water-level comparing unit 56, and corrects at least one of the input command and the output command created by the input/output command creating unit 25 in accordance with the water level difference calculated by the second upper-dam water-level comparing unit 59 and the water level difference calculated by the second lower-dam water-level comparing unit 62.

For example, in a case where the water level L1 of the upper dam D1 satisfies a relation of "L1≥Predetermined Level" or "L1>Predetermined Level", or such a case is estimated (for example, in a case where the first reference value is at a level higher than L1, a water level difference Ld1 between the water level L1 of the upper dam D1 detected by the first upper-dam water-level detecting unit 52 and the first reference value satisfies a relation of "Ld1≤Predetermined Value" or "Ld1<Predetermined Value", or in a case where the first reference value is at a level lower than L1, the corresponding water level difference Ld1 satisfies a relation of "Ld1≥Predetermined Value" or "Ld1>Predetermined Value"), or in a case where the water level L4 of the lower dam D4 satisfies a relation of "L4≥Predetermined Level" or "L4>Predetermined Level", or such a case is estimated (for example, the fourth reference value is at a level higher than L4, a water level difference Ld4 between the water level L4 of the lower dam D4 detected by the second lower-dam water-level detecting unit 61 and the fourth reference value satisfies "Ld4≤Predetermined Value" or "Ld4<Predetermined Value", or in a case where the fourth reference value is at a level lower than L4, the corresponding water level difference Ld4 satisfies a relation of "Ld4≥Predetermined Value" or "Ld4>Predetermined Value"), the fifth input/output correcting unit 63 corrects at least one of the corresponding pumping input and power output such that a relation between the absolute value of the power output of the pumped-storage power generation facility 2 in the power generating operation and the absolute value of the pumping input of the pumped-storage power generation facility 1 in the pumping operation becomes "|Power Output|≥|Pumping Input|" or "|Power Output|>|Pumping Input|", and corrects at least one of the corresponding pumping input and power output such that a relation between the absolute value of the pumping input of the pumped-storage power generation facility 3 in the pumping operation and the absolute value of the power output of the pumped-storage power generation facility 4 in the power generating operation becomes "|Pumping Input|≥|Power Output|" or "|Pumping Input|>|Power Output|".

In addition, in a case where the water level L3 of the upper dam D3 satisfies a relation of "L3≥Predetermined Level" or "L3>Predetermined Level", or such a case is estimated (for example, in a case where the third reference value is at a level higher than L3, a water level difference Ld3 between the water level L3 of the upper dam D3 detected by the second upper-dam water-level detecting unit 58 and the third reference value satisfies a relation of "Ld3≤Predetermined Value" or "Ld3<Predetermined Value", or in a case where the third reference value is at a level lower than L3, the corresponding water level difference Ld3 satisfies a relation of "Ld3≥Predetermined Value" or "Ld3>Predetermined Value"), or in a case where the water level L2 of the lower dam D2 satisfies a relation of "L2≥Predetermined Level" or "L2>Predetermined Level", or such a case is estimated (for example, in a case where the second reference value is at a level higher than L2, the water level difference Ld2 between the water level L2 of the lower dam D2 detected by the first lower-dam water-level detecting unit 55 and the second reference value satisfies a relation of "Ld2≤Predetermined Value" or "Ld2<Predetermined Value", or in a case where the second reference value is at a level lower than L2, the corresponding water level difference Ld2 satisfies a relation of "Ld2≥Predetermined Value" or "Ld2>Predetermined Value"), the fifth input/output correcting unit 63 corrects at least one of the corresponding pumping input and power output such that a relation between the absolute value of the power output of the pumped-storage power generation facility 4 in the power generating operation and the absolute value of the pumping input of the pumped-storage power generation facility 3 in the pumping operation becomes "|Power Output|≥|Pumping Input|" or "|Power Output|>|Pumping Input|", and corrects the corresponding pumping input and power output such that a relation between the absolute value of the pumping input of the pumped-storage power generation facility 1 in the pumping operation and the absolute value of the power output of the pumped-storage power generation facility 2 in the power generating operation becomes "|Pumping Input|≥|Power Output|" or "|Pumping Input|>|Power Output|".

According to the second embodiment, the same effect as in the case of the first embodiment described above is achieved. Further, it is possible to prevent the upper dam D1, the lower dam D2, the upper dam D3, and the lower dam D4 being filled with water while maintaining the pumping operations of the pumped-storage power generation facility 1, the power generating operation of the pumped-storage power generation facility 2, the pumping operation of the pumped-storage power generation facility 3, and the power generating operation of the pumped-storage power generation facility 4.

Further, in the above embodiment, the description has been made about an example in which the pumped-storage power generation facilities 1 and 2 and the pumped-storage power generation facilities 3 and 4 are provided in different power stations, but the invention may be applied even to a case where the pumped-storage power generation facilities 1, 2, 3, and 4 are provided in the same power station.

As described above, according to the embodiments, it is possible to switch the pumping operation and the power generating operation without stopping the pumped-storage power generation facility.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope of the inventions.

The invention claimed is:

1. A pumped-storage power generation control device comprising:
    a first measuring unit that measures a pumping input or an electrical quantity corresponding to the pumping input of a pumped-storage power generation facility in a pumping operation;
    a second measuring unit that measures a power output or an electrical quantity corresponding to the power output of a pumped-storage power generation facility in a power generating operation;
    a control section that controls at least one of the pumping input of the pumped-storage power generation facility in the pumping operation and the power output of the pumped-storage power generation facility in the power generating operation such that a value, which is obtained by a predetermined calculation using the measurement value measured by the first measuring unit and the measurement value measured by the second measuring unit, becomes a set target value; and
    wherein the control section controls at least one of the pumping input of the pumped-storage power generation facility in the pumping operation and the power output of the pumped-storage power generation facility in the power generating operation such that an addition, a difference, or a ratio between the power output of the pumped-storage power generation facility in the power generating operation and the pumping input of the pumped-storage power generation facility in the pumping operation becomes a set target value.

2. The pumped-storage power generation control device according to claim 1,
    wherein the control section controls at least one of the pumping input of the pumped-storage power generation facility in the pumping operation and the power output of the pumped-storage power generation facility in the power generating operation such that a value, which is obtained by subtracting an absolute value of the pumping input of the pumped-storage power generation facility in the pumping operation from an absolute value of the power output of the pumped-storage power generation facility in the power generating operation or a ratio between the absolute value of the power output and the absolute value of the pumping input, becomes a set target value.

3. The pumped-storage power generation control device according to claim 2,
    wherein the control section is capable of changing the target value from a positive value to a negative value or from a negative value to a positive value.

4. The pumped-storage power generation control device according to claim 1, further comprising:
    an input/output correcting unit that is provided with a frequency measuring unit which measures a frequency of an electric power system and a reference frequency setting unit which sets a reference frequency, wherein the input/output correcting unit corrects the target value or at least one of the pumping input of the pumped-storage power generation facility in the pumping operation and the power output of the pumped-storage power generation facility in the power generating operation in accordance with a value which is obtained by a calculation using the frequency measured by the frequency measuring unit and the reference frequency set by the reference frequency setting unit.

5. The pumped-storage power generation control device according to claim 1, further comprising:
    a power output variation estimating unit that estimates a variation of the power output of the pumped-storage power generation facility in the power generating operation based on the measurement value measured by the second measuring unit; and
    an input/output correcting unit that corrects the target value or at least one of the pumping input of the pumped-storage power generation facility in the pumping operation and the power output of the pumped-storage power generation facility in the power generating operation in accordance with a variation in the power output estimated by the power output variation estimating unit.

6. The pumped-storage power generation control device according to claim 1, further comprising:
    an upper-dam water-level detecting unit that detects a water level of an upper dam, the upper dam being used by the pumped-storage power generation facility in the pumping operation and the pumped-storage power generation facility in the power generating operation; and
    an input/output correcting unit that, in a case where the water level of the upper dam detected by the upper-dam water-level detecting unit is equal to or exceeds a certain level, corrects the target value or at least one of the pumping input and power output such that an absolute value of the power output of the pumped-storage power generation facility in the power generating operation becomes equal to or exceeds an absolute value of the pumping input of the pumped-storage power generation facility in the pumping operation.

7. The pumped-storage power generation control device according to claim 1, further comprising:
    an upper-dam water-level detecting unit that detects a water level of an upper dam, the upper dam being used by the pumped-storage power generation facility in the pumping operation and the pumped-storage power generation facility in the power generating operation; and an input/output correcting unit that, in a case where the water level of the upper dam detected by the upper-dam water-level detecting unit is equal to or less than a certain level, corrects the target value or at least one of the pumping input and power output such that an absolute value of the power output of the pumped-storage power generation facility in the power generating operation becomes equal to or less than an absolute value of the pumping input of the pumped-storage power generation facility in the pumping operation.

8. The pumped-storage power generation control device according to claim 1, further comprising:

a lower-dam water-level detecting unit that detects a water level of a lower dam, the lower dam being used by the pumped-storage power generation facility in the pumping operation and the pumped-storage power generation facility in the power generating operation; and an input/output correcting unit that, in a case where the water level of the lower dam detected by the lower-dam water-level detecting unit is equal to or exceeds a certain level, corrects the target value or at least one of the pumping input and power output such that an absolute value of the pumping input of the pumped-storage power generation facility in the pumping operation becomes equal to or exceeds an absolute value of the power output of the pumped-storage power generation facility in the power generating operation.

9. The pumped-storage power generation control device according to claim 1, further comprising:

a lower-dam water-level detecting unit that detects a water level of a lower dam, the lower dam being used by the pumped-storage power generation facility in the pumping operation and the pumped-storage power generation facility in the power generating operation; and an input/output correcting unit that, in a case where the water level of the lower dam detected by the lower-dam water-level detecting unit is equal to or less than a certain level, corrects the target value or at least one of the pumping input and power output such that an absolute value of the pumping input of the pumped-storage power generation facility in the pumping operation becomes equal to or less than an absolute value of the power output of the pumped-storage power generation facility in the power generating operation.

10. The pumped-storage power generation control device according to claim 1, wherein the pumped-storage power generation facility in the pumping operation is a variable speed pumped-storage power generation facility.

11. A pumped-storage power generation control device comprising:

a control section that controls at least one of a pumping input of a first pumped-storage power generation facility in a pumping operation and a power output of a second pumped-storage power generation facility in a power generating operation such that a value, which is obtained by a predetermined calculation using a measurement value of the pumping input or an electrical quantity corresponding to the pumping input of the first pumped-storage power generation facility in the pumping operation and a measurement value of the power output or an electrical quantity corresponding to the power output of the second pumped-storage power generation facility in the power generating operation, becomes a set first target value, and controls at least one of a pumping input of a third pumped-storage power generation facility in the pumping operation and a power output of a fourth pumped-storage power generation facility in the power generating operation such that a value, which is obtained by a predetermined calculation using a measurement value of the pumping input or an electrical quantity corresponding to the pumping input of the third pumped-storage power generation facility in the pumping operation and a measurement value of the power output or an electrical quantity corresponding to the power output of the fourth pumped-storage power generation facility in the power generating operation, becomes a second set target value;

a first upper-dam water-level detecting unit that detects a water level of a first upper dam that is used by the first pumped-storage power generation facility in the pumping operation and the second pumped-storage power generation facility in the power generating operation;

a first lower-dam water-level detecting unit that detects a water level of a first lower dam that is used by the first pumped-storage power generation facility in the pumping operation and the second pumped-storage power generation facility in the power generating operation;

a second upper-dam water-level detecting unit that detects a water level of a second upper dam that is used by the third pumped-storage power generation facility in the pumping operation and the fourth pumped-storage power generation facility in the power generating operation;

a second lower-dam water-level detecting unit that detects a water level of a second lower dam that is used by the third pumped-storage power generation facility in the pumping operation of the fourth pumped-storage power generation facility in the power generating operation; and an input/output correcting unit that, in a case where the water level of the first upper dam detected by the first upper-dam water-level detecting unit is equal to or exceeds a predetermined level, or in a case where the water level of the second lower dam detected by the second lower-dam water-level detecting unit is equal to or exceeds a predetermined level, corrects at least one of the corresponding pumping input and power output such that an absolute value of the power output of the second pumped-storage power generation facility in the power generating operation becomes equal to or exceeds an absolute value of the pumping input of the first pumped-storage power generation facility in the pumping operation, and corrects at least one of the corresponding pumping input and power output such that an absolute value of the pumping input of the third pumped-storage power generation facility in the pumping operation becomes equal to or exceeds an absolute value of the power output of the fourth pumped-storage power generation facility in the power generating operation, and in a case where the water level of the second upper dam detected by the second upper-dam water-level detecting unit is equal to or exceeds a predetermined level or in a case where the water level of the first lower dam detected by the first lower-dam water-level detecting unit is equal to or exceeds a predetermined level, corrects at least one of the corresponding pumping input and power output such that the absolute value of the power output of the fourth pumped-storage power generation facility in the power generating operation becomes equal to or exceeds the absolute value of the pumping input of the third pumped-storage power generation facility in the pumping operation, and corrects at least one of the corresponding pumping input and power output such that the absolute value of the pumping input of the first pumped-storage power generation facility in the pumping operation becomes equal to or exceeds the absolute value of the power output of the second pumped-storage power generation facility in the power generating operation.

12. A pumped-storage power generation control method comprising:

measuring, by a first measuring unit, a pumping input or an electrical quantity corresponding to the pumping input of a pumped-storage power generation facility in a pumping operation;

measuring, by a second measuring unit, a power output or an electrical quantity corresponding to the power output of a pumped-storage power generation facility in a power generating operation;

controlling, by a control section, at least one of the pumping input of the pumped-storage power generation facility in the pumping operation and the power output of the pumped-storage power generation facility in the power generating operation such that a value, which is obtained by a predetermined calculation using a measurement value measured by the first measuring unit and a measurement value measured by the second measuring unit, becomes a set target value; and wherein the control section controls at least one of the pumping input of the pumped-storage power generation facility in the pumping operation and the power output of the pumped-storage power generation facility in the power generating operation such that an addition, a difference, or a ratio between the power output of the pumped-storage power generation facility in the power generating operation and the pumping input of the pumped-storage power generation facility in the pumping operation becomes a set target value.

* * * * *